United States Patent [19]

Chinery

[11] Patent Number: 4,826,087
[45] Date of Patent: May 2, 1989

[54] MANIPULATIVE DEVICE

[76] Inventor: David Chinery, 251 Station Road, Hayes, Middlesex, UB3 4JD, England

[21] Appl. No.: 919,251
[22] PCT Filed: Feb. 6, 1986
[86] PCT No.: PCT/GB86/00064
§ 371 Date: Sep. 17, 1986
§ 102(e) Date: Sep. 17, 1986
[87] PCT Pub. No.: WO86/04537
PCT Pub. Date: Aug. 14, 1986

[30] Foreign Application Priority Data

Feb. 12, 1985 [GB] United Kingdom ................. 8503547

[51] Int. Cl.$^4$ .......................... B25J 9/14; B05B 13/04; E21B 43/28; E21B 7/18
[52] U.S. Cl. ................................ 239/551; 74/471 XY; 137/636; 137/867; 175/424; 239/578; 239/588; 251/294; 604/95
[58] Field of Search ................ 239/587, 588, 256–258, 239/537, 538, 252, 229, 262, 578; 74/471 XY, 501 R; 175/424; 166/222, 223; 299/17; 251/294; 137/636, 636.2, 867; 604/93–95, 112, 113, 118–121, 173, 256, 246–249

[56] References Cited

U.S. PATENT DOCUMENTS

| 671,429 | 4/1901 | Bacon | 175/424 X |
|---|---|---|---|
| 1,232,489 | 7/1917 | Brown | 239/578 X |
| 2,251,916 | 8/1941 | Cross | . |
| 2,498,692 | 2/1950 | Mains | 604/95 |
| 2,696,262 | 12/1954 | Powers | 175/424 X |
| 2,698,665 | 1/1955 | Freeman | 239/578 X |
| 2,873,092 | 2/1959 | Dwyer | . |
| 3,058,473 | 10/1962 | Whitehead | 239/588 X |
| 3,253,481 | 5/1966 | Warhol | 74/471 XY |
| 3,470,876 | 10/1969 | Barchilon | 604/95 |
| 3,843,058 | 10/1974 | Koinzan | . |
| 3,856,209 | 12/1974 | Hickson | 251/294 X |
| 3,873,156 | 3/1975 | Jacoby | 299/17 X |
| 3,958,641 | 5/1976 | Dill | . |
| 4,007,646 | 2/1977 | De Jonge | 74/501 R |
| 4,393,728 | 7/1983 | Larson et al. | . |
| 4,475,902 | 10/1984 | Schubert | 604/95 |

FOREIGN PATENT DOCUMENTS

| 0017016 | 10/1980 | European Pat. Off. | . |
|---|---|---|---|
| 2312264 | 12/1976 | France | 604/256 |
| 1432497 | 4/1976 | United Kingdom | . |
| 2134483 | 8/1984 | United Kingdom | . |

OTHER PUBLICATIONS

Rodrigues, Fernando J M–Estudo Analitico Experimental De Um Mecanismo Articulado Para Manipulacoa Remota, Tese Univ. Fed. Rio de Janeiro, Brasil, Fac. Engenharia, 1978.
Vetco Offshore Inc. Drawing J-181021, 1979.

Primary Examiner—Andres Kashnikow
Attorney, Agent, or Firm—Morgan & Finnegan

[57] ABSTRACT

A manipulative device capable of remote operation has a nozzle head having one or more nozzles adapted to eject a fluid stream having a component at right angles to the axis of the nozzle head. There is a flexible elongate hose for connecting the nozzle head to a source of remote operation, such as a joystick arrangement. Also valves capable of operation by tendons parallel to the flexible elongate hose enables spatial positioning of the nozzle head by remote differential operation of the tendons. The device may be used in various applications for example borehole mining, paint spraying etc.

13 Claims, 6 Drawing Sheets

MANIPULATIVE DEVICE

The present invention relates to manipulative devices capable of being remotely operated.

Manipulative devices enable operations and inspections to be carried out remotely from an operator. Thus they are useful for operating on or inspecting limited access or closed sites such as when handling hazardous materials. Also it is often desirable, for example for jet cutting in borehole mining, to use a nozzle having means which allow nozzle orientation and position to be controlled remotely. This arrangement enables the cutting nozzle to approach the target formation in a water environment closely enough to retain jet cutting efficiency without impairment by jet attenuation caused by too much water between the nozzle and formation.

According to the present invention there is provided a manipulative device capable of remote operation comprising a nozzle head having one or more nozzles adapted to eject a fluid stream having a component at right angles to the axis of the nozzle head, the nozzle head being connectable by a flexible elongate member to a reference point, a means for controlling fluid flow through the nozzles, the means being capable of operation by tendons adapted to follow the curvature of the flexible elongate member whereby, in use, remote differential operation of the tendons enables spatial positioning of the nozzle head.

In one embodiment of the invention, the device is in the form of a cutting nozzle head which has a forwardly directed cutting nozzle capable of controllably jetting fluid. The fluid may be, for example, air or water. The device has a plurality of steering nozzles (preferably three) in the periphery which are capable of jetting fluid outwardly at right angles to the cutting nozzle. The fluid flow through the steering nozzles is controlled preferably by valves, the valves being remotely operable by means of tendons or control wires. The device may have a further nozzle capable of jetting fluid having a backward component of flow so as to provide a forward thrust to the carrier device. Alternatively the device may be moved by separate translational means such as mechanical operation. The device is connected to the source of remote operation by for example, a flexible inextensible hose. The tendons or control wires may be located by rings or tubes on the periphery of the hose and the tendon or control wire lengths are capable of differential variation by means of, for example, a joystick system so as to position the cutting nozzle at a desired location. This arrangement may be used, for example, to controllably hold a cutting jet against the face of a borehole.

The device may be used in various environments such as air, liquids e.g. water and slurries.

The invention will now be described by way of example only and with reference to the accompanying drawings.

Figure 1:
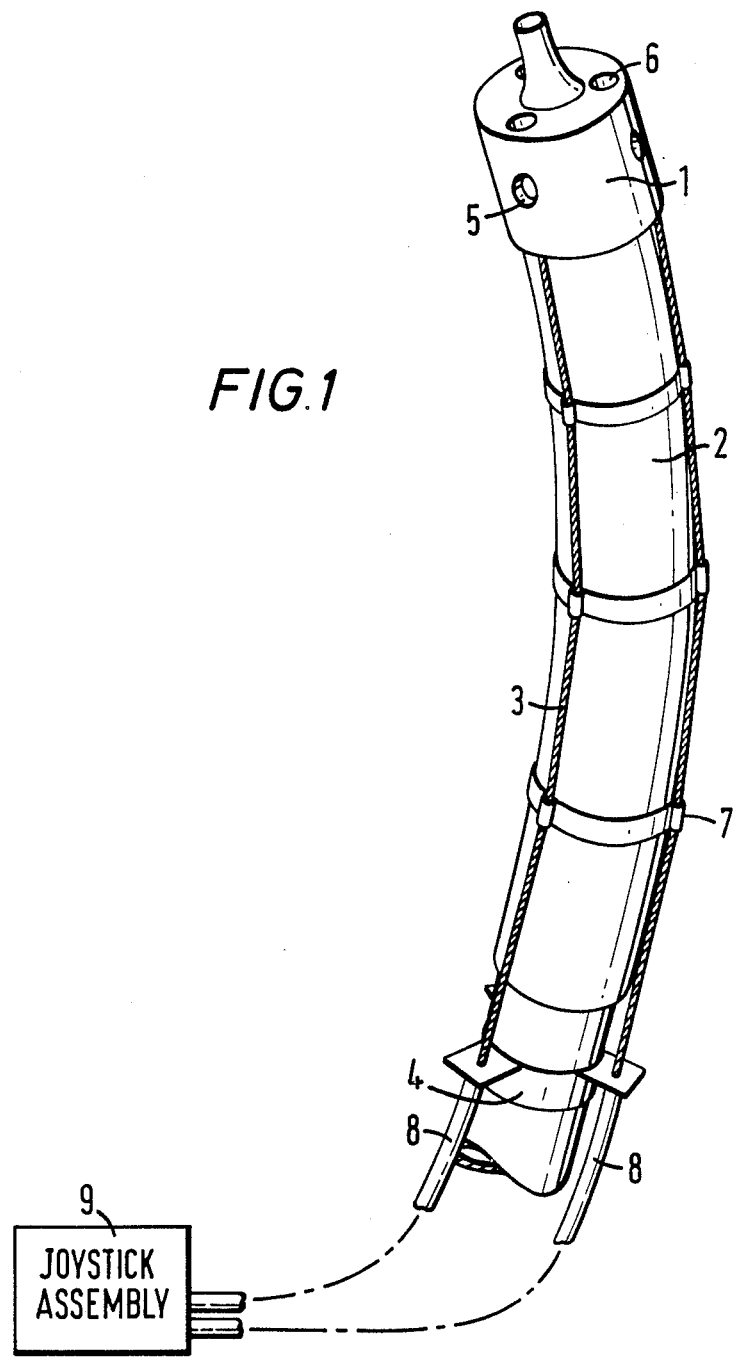
FIG. 1 is a perspective view of a steerable manipulative device.

Economic borehole mining requires that the cutting nozzle can approach close to the target formation so that attenuation of the cutting jet by the surrounding fluid is reduced. FIG. 1 shows a remotely controllable flexible nozzle which is capable of intrinsic positional feedback and self energising restoring force to counteract a disturbance from the desired position. The nozzle comprises manipulative device in the form of a nozzle head (1), a flexible hose (2) and a system of operating tendons (3). The nozzle head has a cutting jet nozzle and three peripheral steering jet nozzles (5), the steering jet nozzles having associated piston valves (6) and are capable of jetting fluid at right angles to the major nozzle head axis. The nozzle head is connected to a length of flexible line or hose (2). The hose (2) is fitted with guide rings (7) which locate three equally spaced stranded wire tendons (3) which are used to operate the piston valves (6) of the steering jet nozzles (5). The tendons (3) are linked to the remote operating source for example a joystick (9) by means of Bowden cables which terminate at a fixed reference point (4) which comprises an abutment ring having three attachment points for the Bowden cable outer tubes (8).

An alternative inextensible hose system could comprise other flexible means, such as bellows or convoluted tubing of say metal or plastics material construction.

Figure 2:
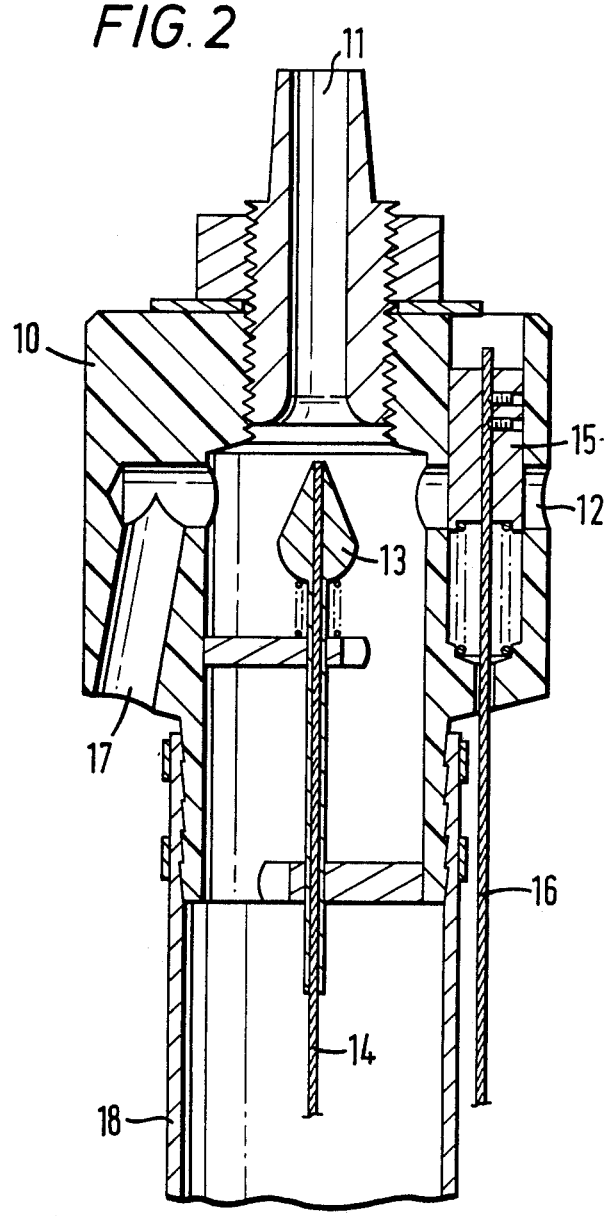
FIG. 2 is a vertical cross section through the nozzle

FIG. 2 shows the nozzle head in more detail. The nozzle head comprises a nylon body (10) having a forwardly directed cutting nozzle (11) and three equally axially spaced steering jet nozzles (12) capable of directing fluid at right angles to the cutting jet nozzle (11). The head has a co-axial plug valve (13) controlling the cutting jet nozzle (11) which is actuated by a tension wire (14) passing along the hose (18) from the supply end. Each steering jet nozzle (12) is operated by a piston valve (15) operated by a tendon wire (16). The head also has a reaction jet (17) which i directed so as to enable advancement of the nozzle head. The nozzle head is connected to a flexible hose having guide ring around its periphery for locating the tendons. The flexible hose (18) is connected through an adaptor to a control unit in the form of a two-axis joystick assembly mechanically operating the nozzle head through the tendons (see FIG. 3).

During use, three jets (5) equi-spaced radially around the nozzle assembly are modulated by piston valves (6) in the assembly to drive it to any desired position (see FIG. 1). The piston valves (6) are controlled by three tendons (3), the lengths of which may be varied differentially, at the fixed end of the hose (2), to define the desired position of the nozzle. The tendons (3) are equi-spaced around the flexible section of the hose and conform to its curvature, which may be in any plane. The tendons act as automatic positional feedback since changes in curvature will be sensed as changes in "length" due to differences in radius inside and outside the bend.

The piston valves (6) are arranged so that extension of the tendon increases the flow and thrust of the steering jet, and vice versa. The self-correction feature may be illustrated by considering a tendon on the outside of the hose curve. If the curvature is less than desired the difference in lengths of the inner and outer tendons will be exaggerated by the smaller than desired difference in radii. Thus the outer tendon will appear to be extended at the nozzle head, allowing the piston valve to open, increasing the jet thrust and tending to increase the curvature, towards the desired position. As the latter is approached, the tendon will appear to "shorten" with the increase in curvature, until the nozzle comes to rest with the positioning jets in equilibrium.

Since the tendons are only controlling the piston valves, forces are low and approximately constant, the fluid pressure on the end of the piston valve providing a steady tensile force to overcome tendon friction and balance tension. A light spring is also fitted to allow the valves to follow tendon movement under low pressure "start-up" conditions.

Figure 3:
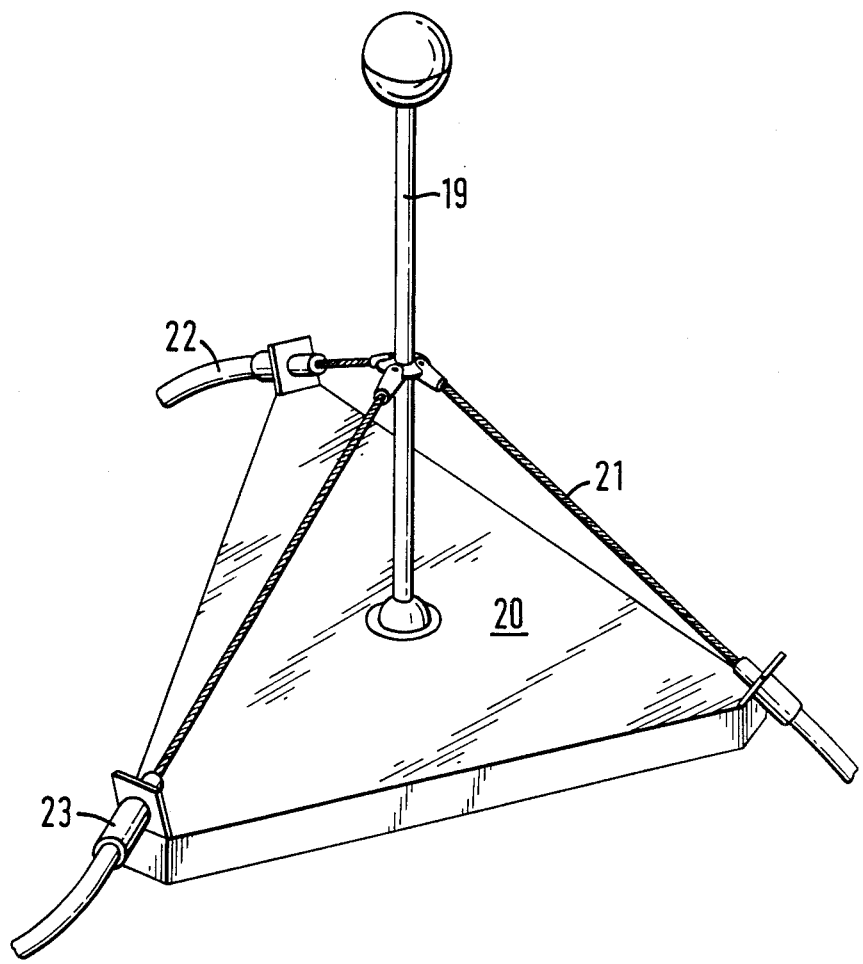
FIG. 3 shows a schematic arrangement of a joystick control unit for the device.

The device is thus controlled by the tendon positions which may be mechanically linked to a simple joystick arrangement (9), or to automatic control devices. FIG. 3 shows a simple joystick unit as used for this application. The joystick (19) is mounted on a triangular base (20) by a ball joint, allowing it to rock in two planes. Attached at the joystick midpoint are the three bowden cable inner wires (21) which lead to the three corners of the base, where the outer tubes (22) of the Bowden cables are terminated. Adjusters (23) allow for fine adjustment of the cable lengths. The wires (21) form a triangular pyramid, and movement of the joystick in any direction varies the length of each of the former differently to provide the necessary linear input to each tendon wire at the device. The nozzle is able to sweep a hemispherical area about the fixed end of the hose. The nozzle will be automatically driven to the defined position, to an accuracy defined by any differential piston valve displacement required to achieve steering jet equilibrium at that position. Any force at the nozzle tending to deflect it from the desired position will be automatically detected by changes in perceived tendon length, and the intensities of the three steering jets will be adjusted to a new equilibrium resisting the disturbing force.

The device will detect and feed back to the remote control joystick the existence of obstacles to it reaching the desired position. Because of the high speed of response to control inputs, the position, angle and velocity of the nozzle carrier body is proportional to the deflection and rate of movement of the joystick. If the moving end of the device encounters an immovable obstruction, it will not be possible to move the joystick further in that direction if the full steering jet control valve stroke has been taken up. With an all-mechanical Bowden cable control link, this provides an automatic tactile force feedback of obstructions to angular deflection of the nozzle.

Reaction thrust from the cutting jet may be opposed by fixed balancer jets. One arrangement would be to arrange the latter to resist, say, 80% of thrust. The three steering jets are now angled backwards, say by 30° towards the fixed end of the nose. By collective movement of all three tendons, the total intensity of the steering jets may be varied to give, say, a variation of 10% to 30% of cutting jet thrust. Thus total overall balancing thrust is adjustable from 90% to 110% of cutting jet thrust, and a nozzle "forward and reverse" control is achieved. Alternatively the steering jets (12) may be used in a direction at right angles to the cutting jet (11) and a separate jet nozzle (17) used which provides a forward thrust (see FIG. 2).

In order to economically mine extensive caverns, additional flexible sections of hose may be connected in series, each independently controlled by it own set of nozzles and tendons. If desired, the flexible sections may be connected by rigid lengths. In this case, the relevant control jets should be situated at the outer end of the rigid section.

If a separate steering jet supply is provided, such as by a coaxial hose, the nozzle may function as a movable suction head with the main passage connected to a jet pump or similar means.

Further possible modes of use of the device are described below.

The device may be used to form a flexible manipulator arm for submersible craft, remotely operated vehicles, or robot devices both subsea and onshore.

In one embodiment, the cutting jet of the device may be replaced by fitting an end effector or gripper to the nozzle body. The flexible inextensible hose section is inflated with fluid, for example water or compressed air, to form a flexible strut to carry the nozzle body and gripper assembly. The position of the nozzle body and gripper, relative to the fixed end is controlled as described above with the steering jets driving the overall tube curvature to that defined by the linear extensions of the three tendons.

Positional accuracy may be increased by replacing the piston valves shown with other valves of "deadbeat" geometry, such as poppet valves. The initial rate of opening of these valves is much higher with respect to any given amount of tendon extension "error" signal. This will result in much smaller valve position and tendon extension "offsets" when the steering jets reach equilibrium, giving a smaller difference between the actual, and desired equilibrium positions. The valves and steering jets will also react more rapidly to any force tending to disturb the gripper from its desired position. For instance, an object picked up by the gripper will transfer its weight to the device "arm", the steering jets automatically sensing and compensating for the new force.

As with similar control systems, mechanical, electrical, or hydraulic, a balance between valve sensitivity and self-oscillation will limit the ultimate amount of positional precision available.

The end effector, or gripper, may be itself multi-functional, for example having "wrist rotation" in addition to grip. These functions may be controlled by mechanical or electrical or other cables passing through the bore of the flexible hose and may be powered by the pressurised working fluid contained in the hose.

Two or more active device sections may be connected in series, with separate control for each section. This will give true 6-axis rotation and translation capability to the gripper and end body.

A typical non-submerged robotic manipulator application would be as a paint-spraying "arm". The paint spray device would be mounted on the nozzle body, deriving its air supply from the "working" air inside the flexible hose, which also powers the steering jets.

In the embodiments described above, the tendon wire positions are controlled from the remote joystick unit by incorporating them as extensions of Bowden cables. For embodiments where this control must be over a distance in excess of, say, 5 meters, mechanical friction in the Bowden cables will inhibit proper control. In this case, the Bowden cables may be replaced by electric, hydraulic, or pneumatic linear positioners controlled remotely from a joystick unit or software-driven control unit. Full positional feedback from positioner to joystick is essential. Ideally, force feedback is also essential due to the obstacle-detecting quality of the servo-snake control method, which would otherwise be lost.

Figure 4:
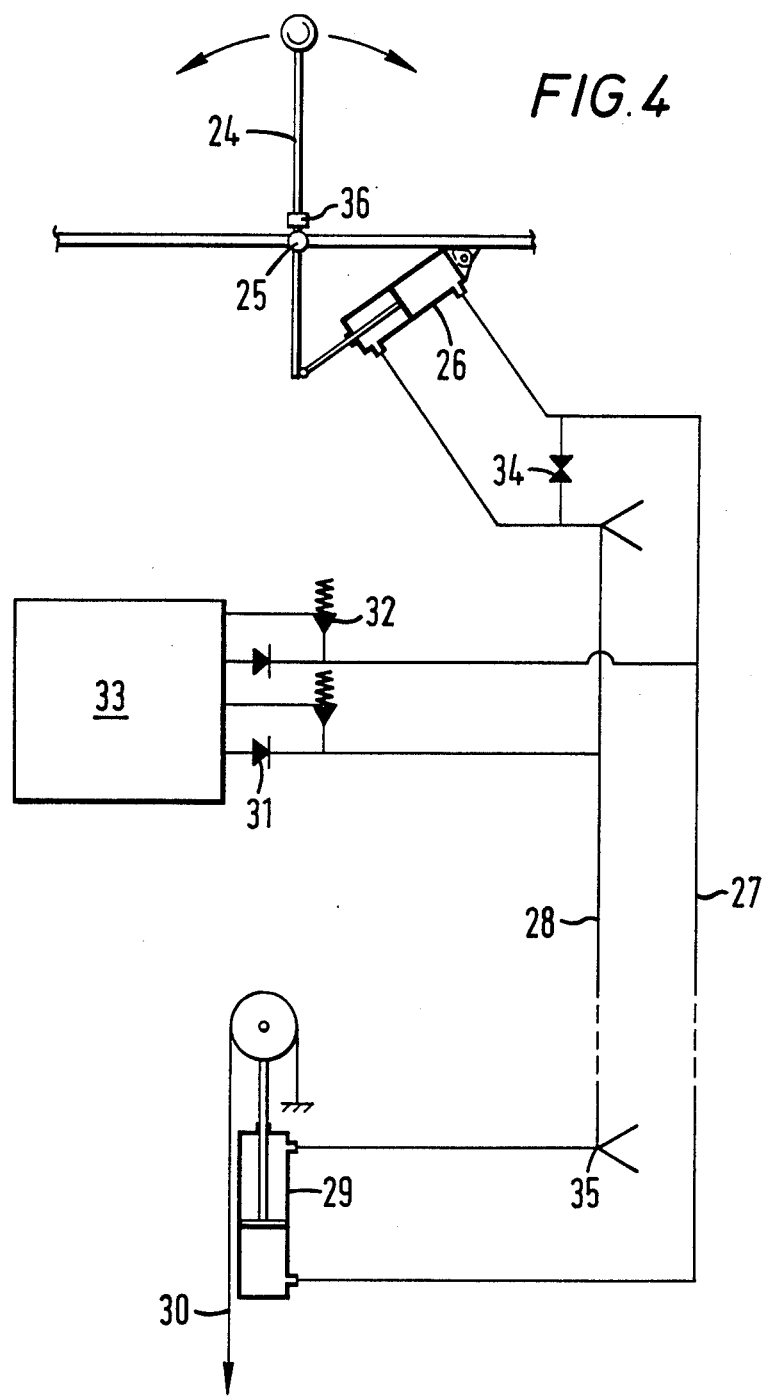
FIG. 4 shows a schematic diagram of a hydraulic system for use with the joystick.

A simple, low pressure, hydraulic "umbilical" system is illustrated in FIG. 4. For simplicity, one tendon "channel" only is shown, a total of three being required to control the three tendons per device section. A joystick (24) is mounted on a ball-joint (25), and connected to a low pressure hydraulic cylinder (26). The pressure side of the piston is connected by the umbilical line (27) which may be up to a hundred meters long, to the pressure side of the slave cylinder (29) located at the fixed (reference) end of the device. The slave cylinder (29) controls the length of tendon wire (30), which is under tension.

The other sides of the joystick and slave cylinder pistons are connected by the common return line (28) to complete the hydraulic circuit.

Movement of the joystick (24) will cause its cylinder piston to move, displacing fluid, and causing the slave cylinder to follow, moving the tendon wire to a new position. The force needed to move the tendon wire will be felt at the joystick.

Since the fluid in the signal side of the circuit (27) should always be pressurised by the tendon wire tension, any leakage in the cylinders will cause the slave cylinder piston to move downwards, losing its relationship to the position of that in the joystick cylinder. If the umbilical pipes (27) and (28) are of significant length, thermal expansion or contraction of the fluid or pipes may also upset the relationship.

Both sides of the circuit are connected to reserve tank (33) via vacuum breaker valves (31) and relief valves (32).

Any mismatch of the cylinder positions may be reset periodically from the joystick unit without access to the remote slave cylinder location. Assuming that the slave piston is displaced downwards to, say, the 25% travel position, the reset process occurs as follows, (a) the joystick cylinder is moved towards its full extension position, (b) because of the positional mismatch, the slave piston will reach the end of its stroke whilst the joystick cylinder is still at 25%. This will be sensed by an increase in force required to move the joystick. For diagnostic purposes, the degree of mismatch may be deduced from the amount of joystick deflection at this point, (c) When the slave cylinder end point is sensed, reset valve (34) is opened, allowing fluid to transfer from left to right of the joystick cylinder piston, and permitting it to reach the end of its travel. Both cylinders are now at their reference position, and (d) Normal operation is resumed by closing the reset valve (34) and returning the joystick cylinder to its working position, which will cause the slave cylinder and tendon wire to follow.

During normal and reset operations any loss of fluid from the control loop will be made up from the reserve tank via the vacuum breaker valves.

Normal system pressure would be below 10 bar but excessive force on the joystick, or abnormal loading on the tendon wire might exceed this. Overpressure in either line is protected against by the relief valves (32), which return fluid to the reserve tank. Since loss of fluid by relief from either side of the control loop will cause a mismatch, opening of a relief valve will be made to cause an indication at the joystick unit that a reset operation is necessary.

A practical system will have three loops as described, one for each tendon. For reasons of cost, simplicity, etc, the three return sides of the loops (28) may be connected to a single line as indicated at (35). Only four hoses are thus required to provide the three independent channels of control. A total of four pairs of valves (31) and (32) are required.

During normal operation, the three joystick cylinder extensions change independently to transmit the three position signals to the tendons. A reset process requires that all three joystick cylinders are simultaneously moved to their reference positions. This may be done by releasing mechanical lock (36), allowing the stick itself to be slid vertically downwards through the ball joint until all three cylinders reach their full extension. The three reset valves (34) would be ganged together to simplify operation.

If the vertical length of the stick lower half is controlled by a mechanical device such as a pneumatic cylinder, the reset operation may be made to occur automatically when a mismatch or relief is detected.

The system described provides a low cost link between joystick and tendon wires, with minimum friction and full position and force feedback.

Figure 5:
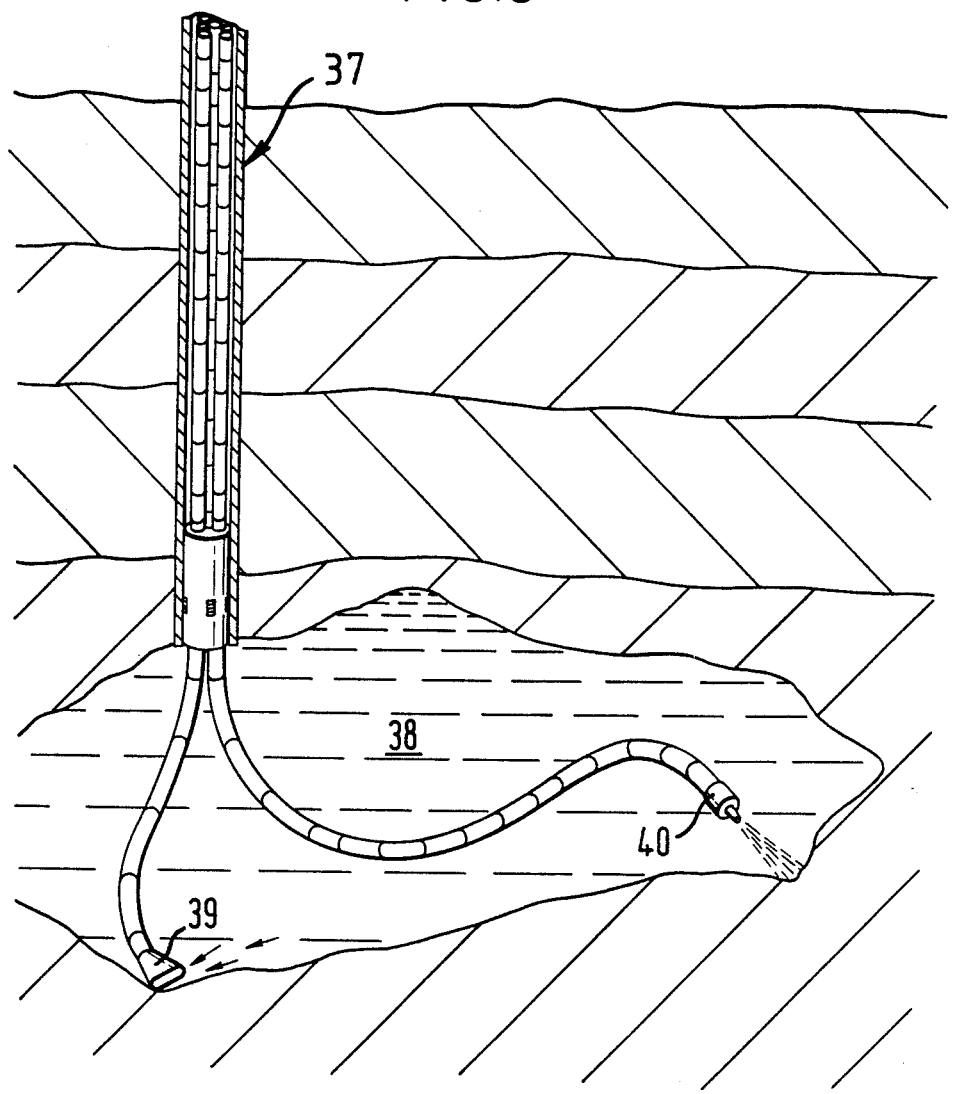
FIG. 5 shows an arrangement using a steerable nozzle unit for borehole mining.

FIG. 5 shows a conceptual approach to borehole mining which uses carrier devices according to the present invention. A well bore section 37 communicates with the cavern 38 and there are carrier devices having a controllable steerable spoil suction head 39 and a steerable cutting head 40. The cutting head 40 displaces, say, minerals from the formation, the spoil being collected by the suction head 39.

Figure 6:
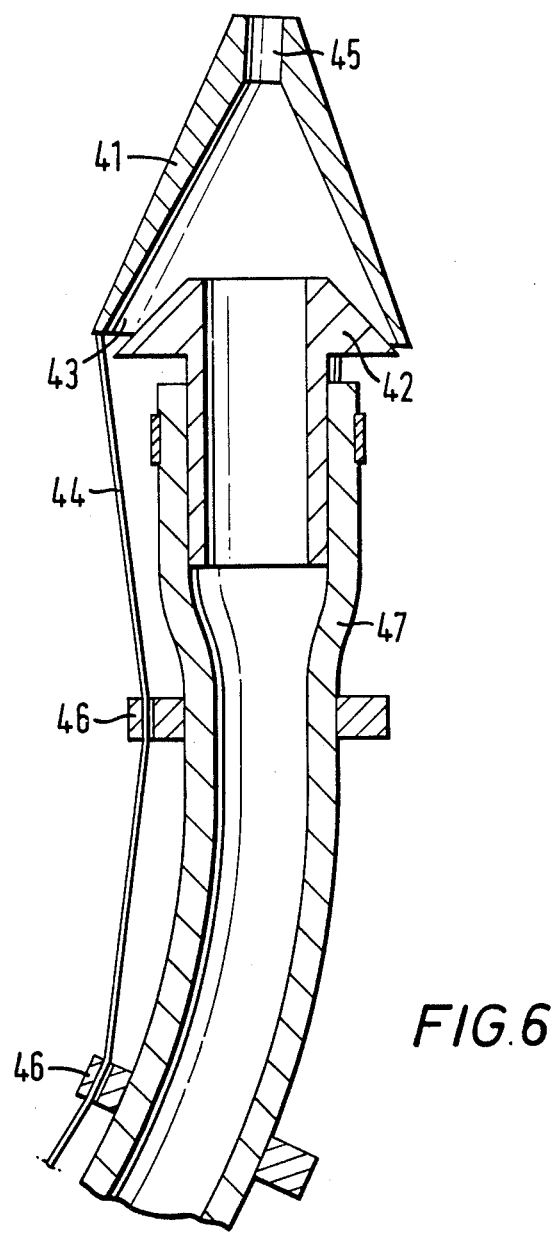
FIG. 6 is a vertical section through a manipulative device having a single peripheral steering nozzle.

FIG. 6 shows an alternative form of nozzle head having a single circumferential fluid outlet. The nozzle head comprises a first cone shaped section 41 and a second cone shaped section 42, the first section 41 being capable of 'floating' on the second section 42 so as to form a circumferential outlet 43. Displacement of the first floating section relative to the fixed second section by the tendon 44 (one of three tendons arranged around the hose) passing through guide rings 46 on the hose 47 given an asymmetric configuration to the fluid jet giving rise to the spatial displacement of the nozzle head. The particular embodiment shown also has a cutting nozzle 45.

I claim:

1. A manipulative device capable of remote operation comprising in combination:
    a nozzle head having an axis and one or more nozzles adapted to eject a fluid stream having a component at right angles to said axis,
    a flexible elongate member connecting said nozzle head to a reference point, said nozzle having means for controlling said fluid streams through said nozzles, tendons operably connected to said fluid control means, said tendons being adapted to follow the curvature of said flexible elongate member so as to impart feedback of said nozzle head position, whereby in use, remote differential operation of said tendons enables spatial positioning of said nozzle head, by said one or more fluid streams.

2. A manipulative device according to claim 1 having a plurality of equally spaced nozzles.

3. A manipulative device according to claim 1 having a single circumferential nozzle.

4. A manipulative device according to claim 3 in which the single circumferential nozzle comprises a first cone shaped section and a second cone shaped section, the first section being capable of floating on the second section to form a circumferential fluid outlet.

5. A manipulative device according to claim 1 in which the nozzle or nozzles have a component of velocity enabling translational movement of the nozzle head.

6. A manipulative device according to claim 1 having separate means for translational movement.

7. A manipulative device according to claim 1 in which the flexible elongate member is a flexible inextensible hose, a system of bellows or convoluted tubing.

8. A manipulative device according to claim 7 in which the tendons are located by guide rings or a tube on the periphery of the flexible inextensible hose.

9. A manipulative device according to claim 7 in which the flexible elongate member comprises a plurality of flexible sections, each of which is capable of separate control by nozzles and tendons.

10. A manipulative device according to claim 1 having means for remote operation of the tendons comprising a joystick system.

11. A manipulative device according to claim 1 having means for remote operation comprising electric, hydraulic or pneumatic linear positioners controllable remotely from a joystick unit or a software driven control unit.

12. A manipulative device according to claim 1 in which the fluid controlling means are valves.

13. A manipulative device according to claim 1 having a cutting nozzle.

* * * * *